United States Patent
Huang et al.

(10) Patent No.: US 11,782,428 B2
(45) Date of Patent: *Oct. 10, 2023

(54) TRANSPORT SYSTEM AND METHOD

(71) Applicant: Taiwan Semiconductor Manufacturing Company, Ltd., Hsinchu (TW)

(72) Inventors: Wei-Pin Huang, Toufen Township, Miaoli County (TW); Wen-Chi Chien, Toufen Township, Miaoli County (TW); Yuh-Dean Tsai, Hsinchu (TW); Bing-Yuan Cheng, Zhubei (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 40 days.

This patent is subject to a terminal disclaimer.

(21) Appl. No.: 17/385,018

(22) Filed: Jul. 26, 2021

(65) Prior Publication Data

US 2021/0349451 A1 Nov. 11, 2021

Related U.S. Application Data

(63) Continuation of application No. 16/702,001, filed on Dec. 3, 2019, now Pat. No. 11,092,949, which is a
(Continued)

(51) Int. Cl.
*G05B 19/418* (2006.01)

(52) U.S. Cl.
CPC ............ *G05B 19/4189* (2013.01); *G05B 2219/45031* (2013.01); *Y02P 90/02* (2015.11)

(58) Field of Classification Search
None
See application file for complete search history.

(56) References Cited

U.S. PATENT DOCUMENTS

| 5,329,732 A | 7/1994 | Karlsrud et al. |
| 5,980,183 A | 11/1999 | Fosnight |

(Continued)

OTHER PUBLICATIONS

Pending U.S. Appl. No. 14/166,892, filed Jan. 29, 2014. (U.S. Appl. No. 14/166,892 is no longer pending and is now U.S. Pat. No. 9,606,532 B2).

(Continued)

*Primary Examiner* — Jennifer L Norton
(74) *Attorney, Agent, or Firm* — McClure, Qualey & Rodack, LLP

(57) ABSTRACT

A transport system is provided. The transport system includes a stocker configured to store an assigned wafer carrier and having a gate port. The transport system also includes a semiconductor apparatus configured to transmit a request signal including a processed time according to a processing wafer carrier loaded on the semiconductor apparatus. The transport system further includes a vehicle configured to transport the assigned wafer carrier from the gate port to the semiconductor apparatus and a control system configured to control the vehicle. When the control system receives the request signal, the control system controls the stocker to transport the assigned wafer carrier inside of the stocker to the gate port at a start time, which is earlier than the processed time, and the control system controls the vehicle to transport the assigned wafer carrier from the gate port to the semiconductor apparatus.

20 Claims, 10 Drawing Sheets

Related U.S. Application Data continuation of application No. 14/323,090, filed on Jul. 3, 2014, now Pat. No. 10,520,932.

(56) References Cited

U.S. PATENT DOCUMENTS

| | | | |
|---|---|---|---|
| 6,577,913 B2 | 6/2003 | Byun et al. | |
| 6,745,093 B1 * | 6/2004 | Kawano | G05B 19/41865 700/121 |
| 7,068,351 B2 | 6/2006 | Van Den Nieuwelaar et al. | |
| 7,195,407 B2 | 3/2007 | Van Den Nieuwelaar et al. | |
| 8,204,617 B2 * | 6/2012 | Teferra | G05B 19/4189 414/940 |
| 8,483,866 B2 | 7/2013 | Huang et al. | |
| 9,606,532 B2 | 3/2017 | Huang et al. | |
| 10,042,356 B2 * | 8/2018 | Iida | G05B 19/4189 |
| 2002/0011203 A1 | 1/2002 | Kim | |
| 2003/0013285 A1 | 1/2003 | Gramarossa et al. | |
| 2006/0039781 A1 | 2/2006 | Niewmierzycki et al. | |
| 2006/0190118 A1 * | 8/2006 | Teferra | G05B 19/4189 700/112 |
| 2006/0201375 A1 | 9/2006 | Wakabayashi et al. | |
| 2007/0185604 A1 * | 8/2007 | Kobayashi | G06Q 10/08 700/112 |
| 2008/0015723 A1 | 1/2008 | Chen et al. | |
| 2008/0275582 A1 | 11/2008 | Nettles et al. | |
| 2009/0088895 A1 | 4/2009 | Schmidt et al. | |
| 2009/0226294 A1 * | 9/2009 | Sekido | H01L 21/67745 118/704 |
| 2010/0185305 A1 | 7/2010 | Lin et al. | |
| 2010/0278622 A1 | 11/2010 | Huang et al. | |
| 2011/0082579 A1 | 4/2011 | Koshida et al. | |
| 2013/0079913 A1 | 3/2013 | Oza et al. | |
| 2014/0018955 A1 | 1/2014 | Asakawa et al. | |
| 2014/0067110 A1 | 3/2014 | Lawson et al. | |
| 2014/0068753 A1 | 3/2014 | Gonzalez et al. | |
| 2014/0099176 A1 | 4/2014 | Nogi et al. | |
| 2014/0277668 A1 | 9/2014 | Oza et al. | |
| 2015/0162180 A1 | 6/2015 | Grau et al. | |
| 2015/0162228 A1 | 6/2015 | Wang et al. | |
| 2015/0212517 A1 * | 7/2015 | Huang | G05B 19/41865 700/112 |
| 2016/0126120 A1 | 5/2016 | Oza et al. | |
| 2016/0276194 A1 * | 9/2016 | Wang | H01L 21/67766 |
| 2016/0293461 A1 | 10/2016 | Roberts, Jr. et al. | |
| 2018/0282076 A1 | 10/2018 | Huber | |
| 2019/0250594 A1 | 8/2019 | You et al. | |
| 2019/0258231 A1 | 8/2019 | Dellangelo et al. | |

OTHER PUBLICATIONS

Global Foundries, "Global Foundries Fabrication Lab 8—Integration Testing and Developement Center"—StoryBoard, Jul. 19, 2011, HardOCP TV, Standard YouTube License, <http://www.youtube.com/watch?v=SCskPVOOkU>.

Global Foundries, "Global Foundries Fabrication Lab 8—Integration Testing and Developement Center"—Script, Jul. 19, 2011, HardOCP TV, Standard YouTube License, <http://www.youtube.com/watch?v=SCskPVOOkU>.

* cited by examiner

TRANSPORT SYSTEM AND METHOD

CROSS REFERENCE

This application is a Continuation of U.S. application Ser. No. 16/702,001, filed on Dec. 3, 2019, which is a Continuation of U.S. application Ser. No. 14/323,090, filed on Jul. 3, 2014 (now. U.S. Pat. No. 10,520,932, issued on Dec. 31, 2019), the entirety of which are incorporated by reference herein.

BACKGROUND

The manufacture of semiconductor devices involves the performance of a series of processing steps using a variety of high-tech production and metrology tools in a certain order and often within a certain period of time (such as Q-time). The primary function of a wafer logistics system in a wafer fabrication facility, or "fab," is to deliver the wafers to each of the tools at the right time, as well as to track the location and status of the wafers throughout the process.

Automated material handling systems, AMHS, are applied to wafer fabs to carry out automated functions more efficiently, consistently, and safely than can be done via manual means. While growth in wafer size from 200 mm to 300 mm or 450 mm has rendered the fabrication process more economical in some respects, it has also placed additional demands on the process. Such demands include the necessity for cross-floor and cross-phase transportation and increased transportation volume, the combination of which often results in traffic jams.

Although existing devices and methods to deliver wafers have been generally adequate for their intended purposes, they have not been entirely satisfactory in all respects. Consequently, it would be desirable to provide a solution for improving the delivery of wafers.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
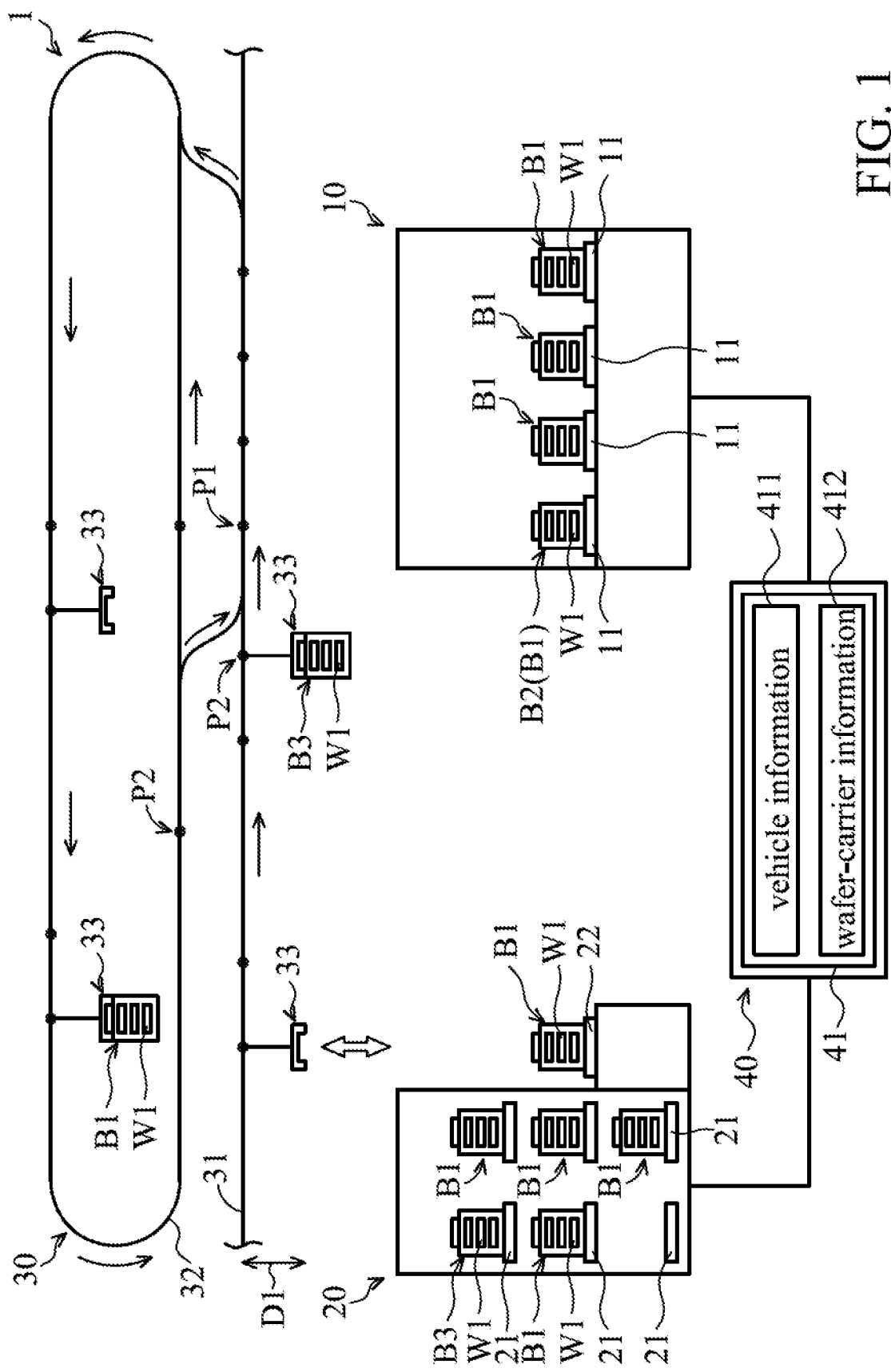
FIG. 1 is a schematic view of a transport system in accordance with some embodiments of the disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Some variations of the embodiments are described. Throughout the various views and illustrative embodiments, like reference numbers are used to designate like elements. It is understood that additional operations can be provided before, during, and after the method, and some of the operations described can be replaced or eliminated for other embodiments of the method.

A transport system and method for a wafer fabrication facility are provided. The time to deliver wafers to a semiconductor apparatus is reduced by transporting a wafer carrier before a load port of the semiconductor apparatus is available.

FIG. 1 is a schematic view of a transport system 1 in accordance with some embodiments of the disclosure. The transport system 1 includes a semiconductor apparatus 10, a stocker 20, an OHT (Over Hoist Transport) system 30, and a control system 40. The semiconductor apparatus 10 is configured to perform a semiconductor manufacturing process on wafers W1.

In some embodiments, the semiconductor apparatus 10 includes a chemical mechanical polishing (CMP) apparatus, a physical vapor deposition (PVD) apparatus, a chemical vapor deposition (CVD) apparatus, an ion implant apparatus, an epitaxy apparatus, a sputter apparatus, a thermal processing apparatus, an etching apparatus, a photolithography apparatus, or another suitable apparatus. In some embodiments, the semiconductor manufacturing process includes a CMP process, a PVD process, a CVD process, an ALD process, a doping process, a screen printing process, a dry etching process, a wet etching process, a photolithography process, or another suitable processes.

The semiconductor apparatus 10 includes a number of load ports 11. The load ports 11 are configured to load wafer carriers B1. In general, the semiconductor apparatus 10 includes, but not limited to, one to four load wafer carriers B1. The wafer carriers B1 are configured to contain wafers W1. In some embodiments, some of the wafer carriers B1 are empty wafer carriers without containing any wafers. In some embodiments, the wafer carrier is a wafer pod, a front opening unified pod (FOUP), a wafer lot, a wafer cassette, or a wafer boat.

When the wafer carrier B1 is loaded at the load port 11, the semiconductor apparatus 10 takes one or more wafers W1 at the same time from the wafer carrier B1. After the wafer W1 is processed by the semiconductor apparatus 10, the wafer W1 is put back into the wafer carrier B1.

The stocker 20 is configured to store a number of wafer carriers B1. The stocker 20 includes a number of support bases 21 inside the stocker 20 and a number of gate ports (load ports) 22. The gate ports 22 are configured to load the wafer carriers B1. When the wafer carrier B1 needs to be stored in the stocker 20, the wafer carrier B1 is to be loaded at the gate port 22 first, and afterward the stocker 20 transports the wafer carrier B1 loaded at the gate port 22 to one of the support bases 21. When one of the wafer carriers B1 inside the stocker 20 needs to be transported to the semiconductor apparatus 10, the stocker 20 transports the wafer carrier B1 loaded at the support base 21 to the gate port 22. Afterward, the OHT system 30 takes the wafer carrier B1 from the gate port 22 and transports the wafer carrier B1 to the semiconductor apparatus 10.

The OHT system 30 includes a number of main tracks 31, a number of circular tracks 32 and a number of vehicles 33. In the FIG. 1, only one main track 31 and one circular track 32 are illustrated for clarity. The circular track 32 is connected at the main track 31. The vehicle 33 is moveable along the main track 31 and the circular track 32. The vehicle 33 is configured to transport one of the wafer carriers B1. In some embodiments, the vehicle 33 transports the wafer carrier B1 from the stocker 20 to the semiconductor apparatus 10, or from the semiconductor apparatus 10 to the stocker 20.

Furthermore, the vehicle 33 is able to move along a vertical direction D1. In some embodiments, the vehicle 33 moves downwardly to attach the wafer carrier B1 loaded at the load port 11 or the gate port 22, and then the vehicle 33 hoists the wafer carrier B1 to a position close to the main track 31. The vehicle 33 with the wafer carrier B1 moves along the main track 31 and/or the circular track 32. In some embodiments, the vehicle 33 moves downwardly to put the wafer carrier B1 at the load port 11 or the gate port 22, and then the vehicle 33 detaches the wafer carrier B1. Afterward, the vehicle 33 leaves form the wafer carrier B1 and rises up to back to the position close to the main track 31.

The control system 40 is coupled with the semiconductor apparatus 10, the stocker 20, and the OHT system 30. The control system 40 is configured to control the stocker 20 and the vehicle 33. In some embodiments, the control system 40 is a wafer logistics system. In some embodiments, the control system 40 is a computer. The control system 40 includes a database 41 storing units of vehicle information 411 and units of wafer-carrier information 412. Each unit of the vehicle information 411 corresponds to one of the vehicles 33, and each unit of the wafer-carrier information 412 corresponds to one of the wafer carriers B1.

Figure 2:
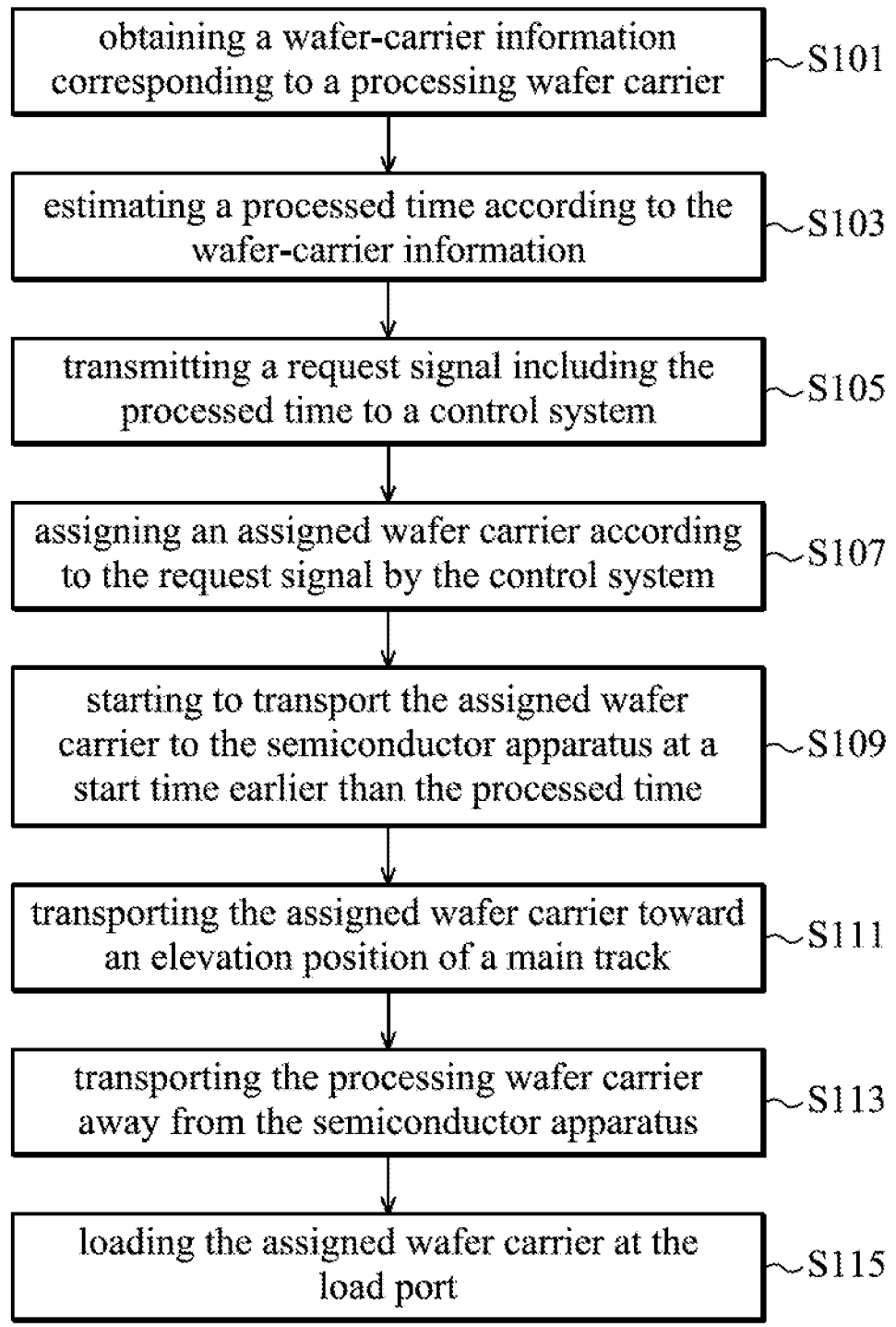
FIG. 2 is a flow chart of a transport method in accordance with some embodiments of the disclosure.
Figure 3:
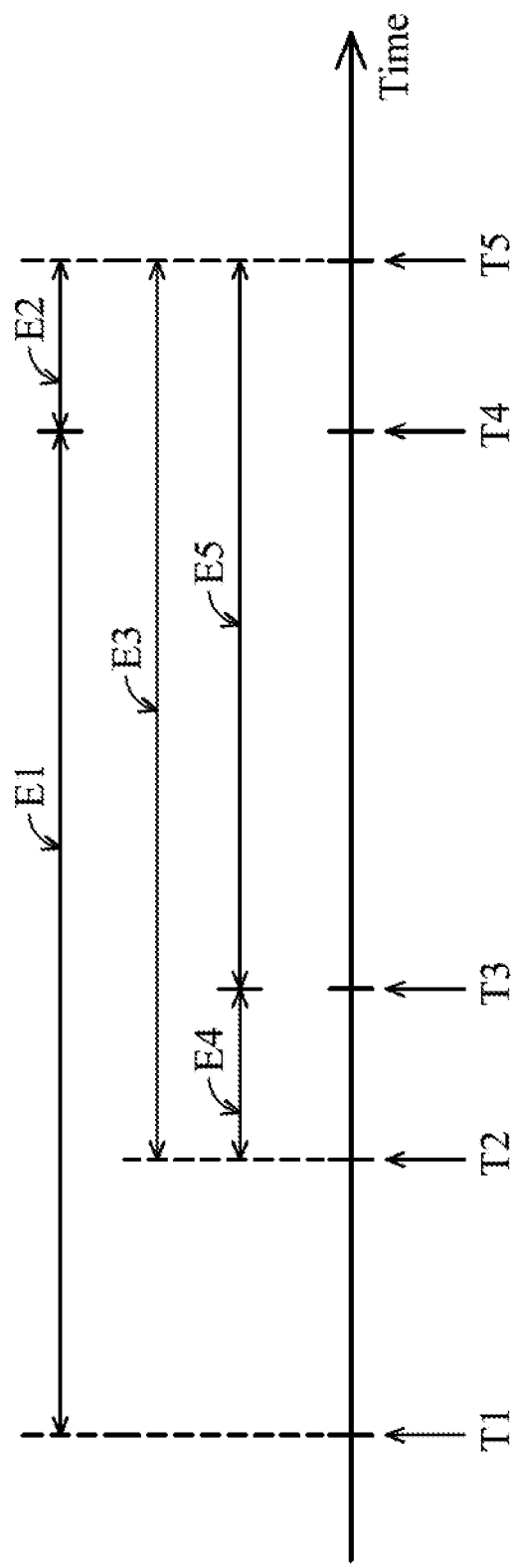
FIG. 3 is a timing chart of the transport method in accordance with some embodiments of the disclosure.

FIG. 2 is a flow chart of a transport method in accordance with some embodiments of the disclosure. FIG. 3 is a timing chart of the transport method in accordance with some embodiments of the disclosure.

In step S101, each of the load ports 11 loads one wafer carrier B1 as shown in FIG. 1. In some embodiments, one of the wafer carriers B1 loaded at the load ports 11 is assigned as a processing wafer carrier B2 as shown in FIG. 1.

In some embodiments, the processing wafer carrier B2 contains a number of wafers W1. When the processing wafer carrier B2 is loaded at the load port 11, the semiconductor apparatus 10 obtains the wafer-carrier information 412 corresponding to the processing wafer carrier B2. In some embodiments, each unit of the wafer-carrier information 412 includes wafer carrier ID (identification code) and units of wafer data. Each unit of the wafer data corresponds to one of the wafers W1 contained in the wafer carrier B1.

In some embodiments, the semiconductor apparatus 10 obtains a wafer carrier ID from the processing wafer carrier B2. The semiconductor apparatus 10 transmits a wafer carrier-information request signal to the control system 40. The control system 40 searches and selects one unit of the wafer-carrier information 412 that corresponds to the wafer carrier ID from the database 41. Afterward, the control system 40 transmits the wafer-carrier information 412 that corresponds to the wafer carrier ID to the semiconductor apparatus 10.

In step S103, the semiconductor apparatus 10 estimates a processed time T4 according to the wafer data of the wafer-carrier information 412. In some embodiments, the processed time T4 is defined as a point of the time that the wafers W1 of the processing wafer carrier B2 have been processed by the semiconductor apparatus 10.

In some embodiments, the semiconductor apparatus 10 finds out a recipe corresponding to the wafer data of the wafer-carrier information 412. The recipe defines the processes that the semiconductor apparatus 10 performs on the wafers W1 and the periods of the processes. The semiconductor apparatus 10 estimates the processed time T4 and/or a process period E1 according to the recipe, the number of wafers and the processed times of other wafer carriers B1 loaded at the load ports 11. In some embodiments, a process period E1 is defined as the period between the time at which the processing wafer carrier B2 is loaded at the load port 11 and the processed time T4.

In step S105, the semiconductor apparatus 10 transmits a request signal to the control system 40 at a request time T1. In some embodiments, the processing wafer carrier B2 is loaded at the load port 11 at about the request time T1. In some embodiments, a process period E1 is defined as the period between the request time T1 and the processed time T4. The request time T1 is earlier than the processed time T4 by about the process period E1 as shown in FIG. 3.

In some embodiments, the request signal includes an apparatus ID (identification code), the processed time T4, and a request condition. The apparatus ID corresponds to the semiconductor apparatus 10. The request condition defines the characteristics of the semiconductor apparatus 10, and/or the request for wafers W1 proceeded by the semiconductor apparatus 10.

For example, the request condition includes process data. The process data corresponds to a semiconductor manufacturing process that the semiconductor apparatus 10 performs on the wafer. In some embodiments, the request condition includes wafer-type data about what type of the wafers W1 can be processed by the semiconductor apparatus 10.

In step S107, the control system 40 receives the request signal and assigns one of the wafer carriers B1 as an assigned wafer carrier B3 (as shown in FIG. 1) according to the request signal. In some embodiments, the control system 40 searches and finds out some units of the wafer-carrier information 412 matching the request condition of the request signal. Furthermore, the control system 40 selects the most suitable one from the units of the wafer-carrier information 412 selected by the control system 40 according to a judgment condition.

In some embodiments, the wafer-carrier information 412 further includes priority data and a quality time (Q-time). The judgment condition is that the control system 40 selects the most suitable one from the units of the wafer-carrier information 412 from the database 41 according to the priority data and/or the quality time.

In step 109, the control system 40 controls the stocker 20 or the vehicle 33 starting to transport the assigned wafer carrier B3 to the semiconductor apparatus 10 at a start time T2, which is earlier than the processed time T4. Since the assigned wafer carrier B3 is transported before the wafers 11 of the processing wafer carrier B2 are processed, a waiting period between the processed time T4 and the delivery time T5 is shortened. Therefore, the production rate of the semiconductor apparatus 10 is increased. Moreover, since the delivery time T5 is early, the assigned wafer carrier B3 can be processed by the semiconductor apparatus 10 in Q-time. Therefore, the yield of the wafers W1 of the assigned wafer carrier B3 is improved.

The control system 40 estimates a detaching period E2. The processing wafer carrier B2 is detached from the load port 11 of the semiconductor apparatus 10 during the detaching period E2. The control system 40 estimates a delivery time T5 at which the assigned wafer carrier B3 is loaded at the load port 11 of the semiconductor apparatus 10 according to the processed time T4 and the detaching period E2. In some embodiments, the delivery time T5 is later than the processed time T4 by about the detaching period E2. Thus, the delivery time T5 is determined according to the processed time T4 plus the detaching period E2.

In some embodiments, the control system 40 controls one of the vehicles 33 to transport the processing wafer carrier B2 away from the semiconductor apparatus 10 at about the processed time T4. In some embodiments, the detaching period E2 is in a range from about 6 seconds to about 10 seconds. Since the detaching period E2 is short, the processed time T4 is almost the same as the delivery time T5.

In some embodiments, the assigned wafer carrier B3 is stored in the stocker 20. The control system 40 plans a transport path, and then the assigned wafer carrier B3 is transported from the stocker 20 to the load port 11 of the semiconductor apparatus 10. Afterward, the control system 40 estimates a transport period E3 according to a transport path. In some embodiments, the transport period E3 is defined as a period during which the assigned wafer carrier B3 is transported from the stocker 20 to the load port 11 of the semiconductor apparatus 10. Therefore, in some embodiments, the start time T2 is determined according to the processed time T4 or the delivery time T5 minus the transport period E3.

The start time T2 is earlier than the delivery time T5 or the processed time T4 by about the transport period E3 or less. In some embodiments, the process period E1 is larger than the transport period E3 estimated by the control system 40. The start time T2 is earlier than the processed time T4 by about the process period E1 or less.

In some embodiments, the transport period E3 includes a stocker period E4 and an OHT period E5. The control system 40 estimates the stocker period E4 according to the time it takes for the assigned wafer carrier B3 to be transported from the inside of the stocker 20 to the gate port 22 of the stocker 20. The control system 40 estimates the OHT period E5 according to the time it takes for the assigned wafer carrier B3 to be transported from the gate port 22 of the stocker 20 to the load port 11 of the semiconductor apparatus 10. Thus, the OHT period E5 is defined as the period during which the assigned wafer carrier B3 is transported by the vehicle 33.

In some embodiments, the start time T2 is earlier than the processed time T4 by about the stocker period E4 or greater. In some embodiments, the start time T2 is earlier than the processed time T4 by about the OHT period E5 or greater.

In some embodiments, when the transport period E3 estimated by the control system 40 is longer than the processed time T4, the control system 40 starts to transport the assigned wafer carrier B3 to the semiconductor apparatus 10 immediately. Alternately, the control system 40 chooses to assign another wafer carrier B1 as an assigned wafer carrier.

Figure 4A:
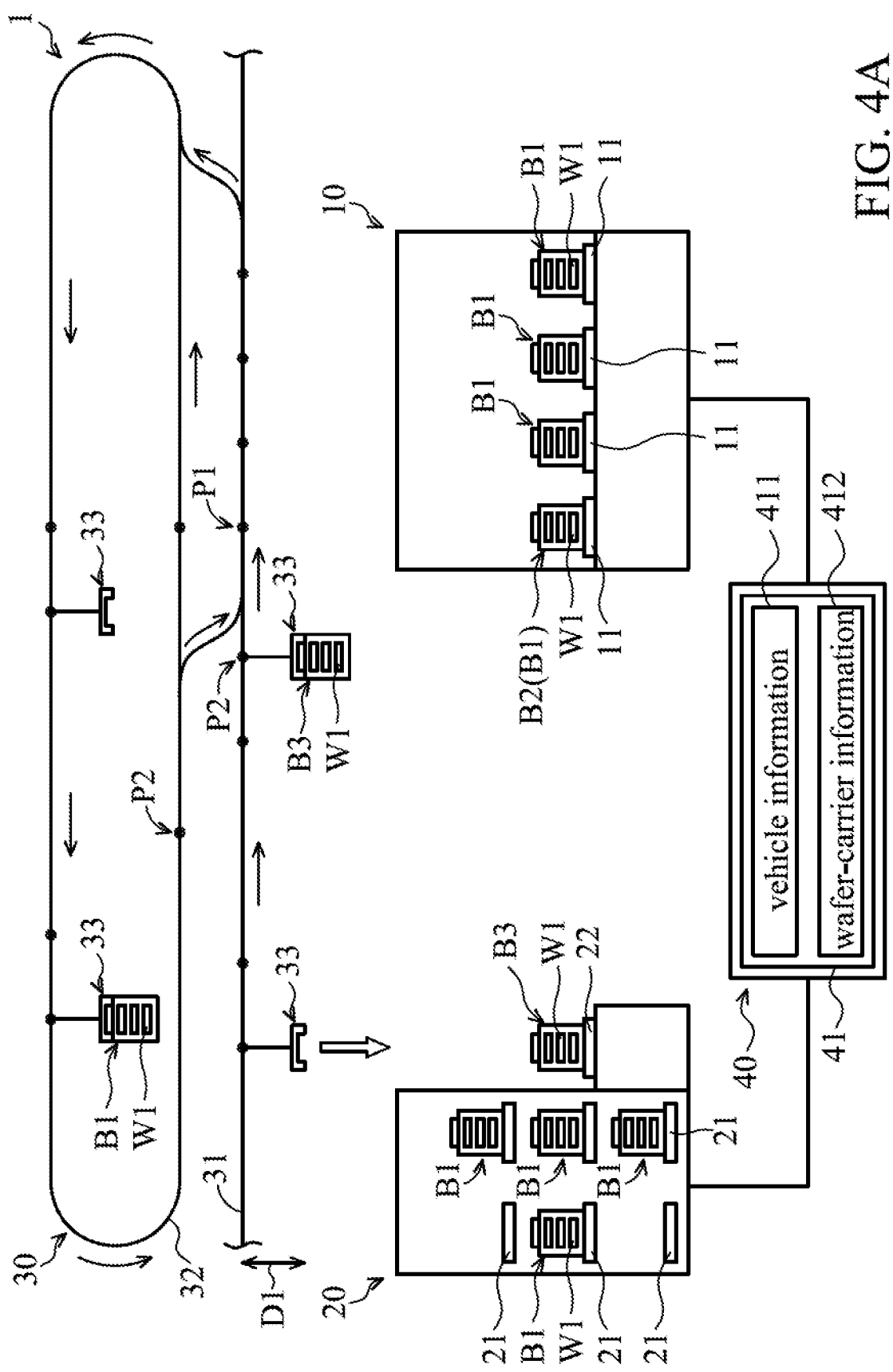
FIGS. 4A to 4C are schematic views of the transport system during intermediate stages of the transport method.
Figure 4B:
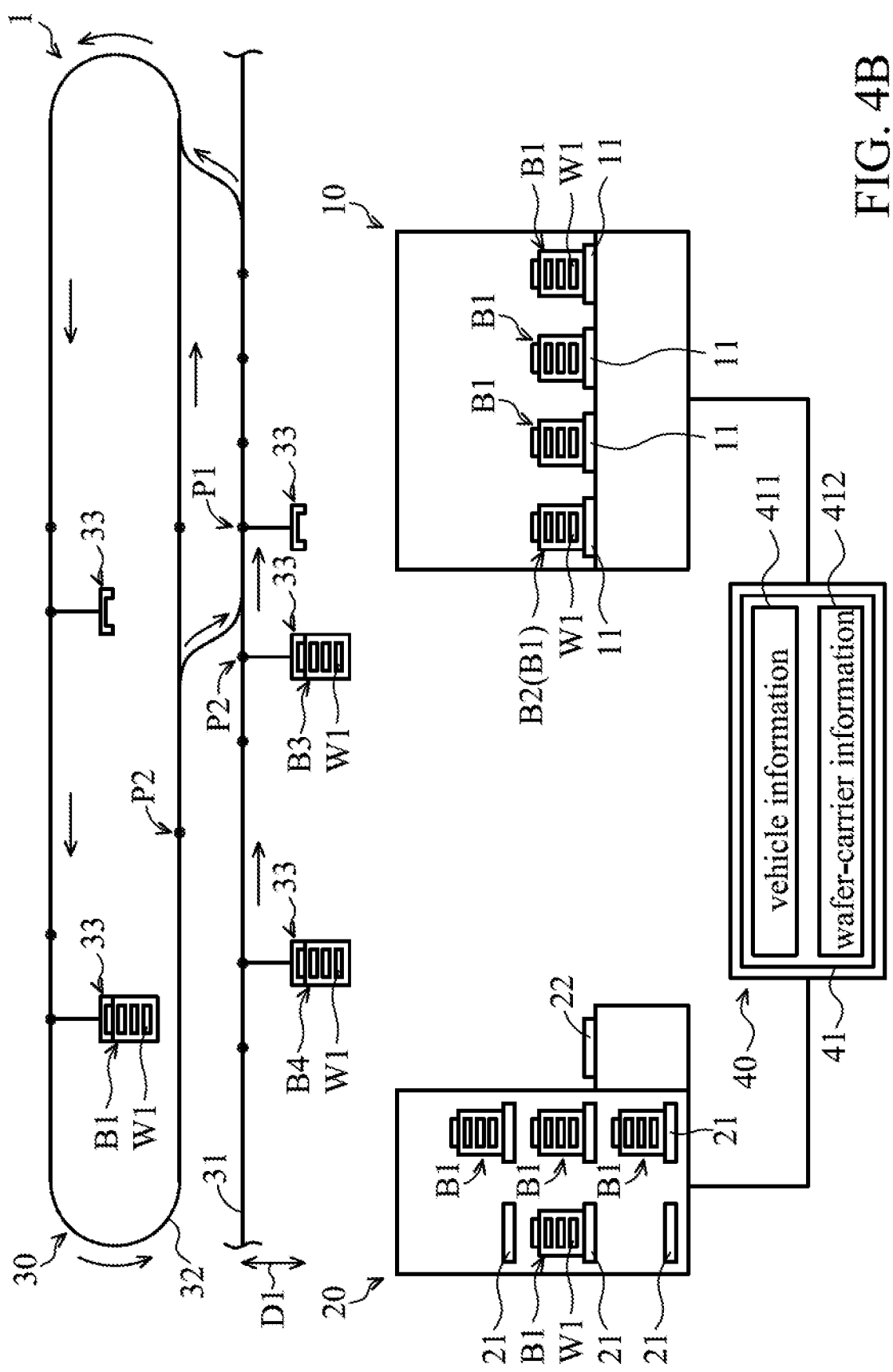
Figure 4C:
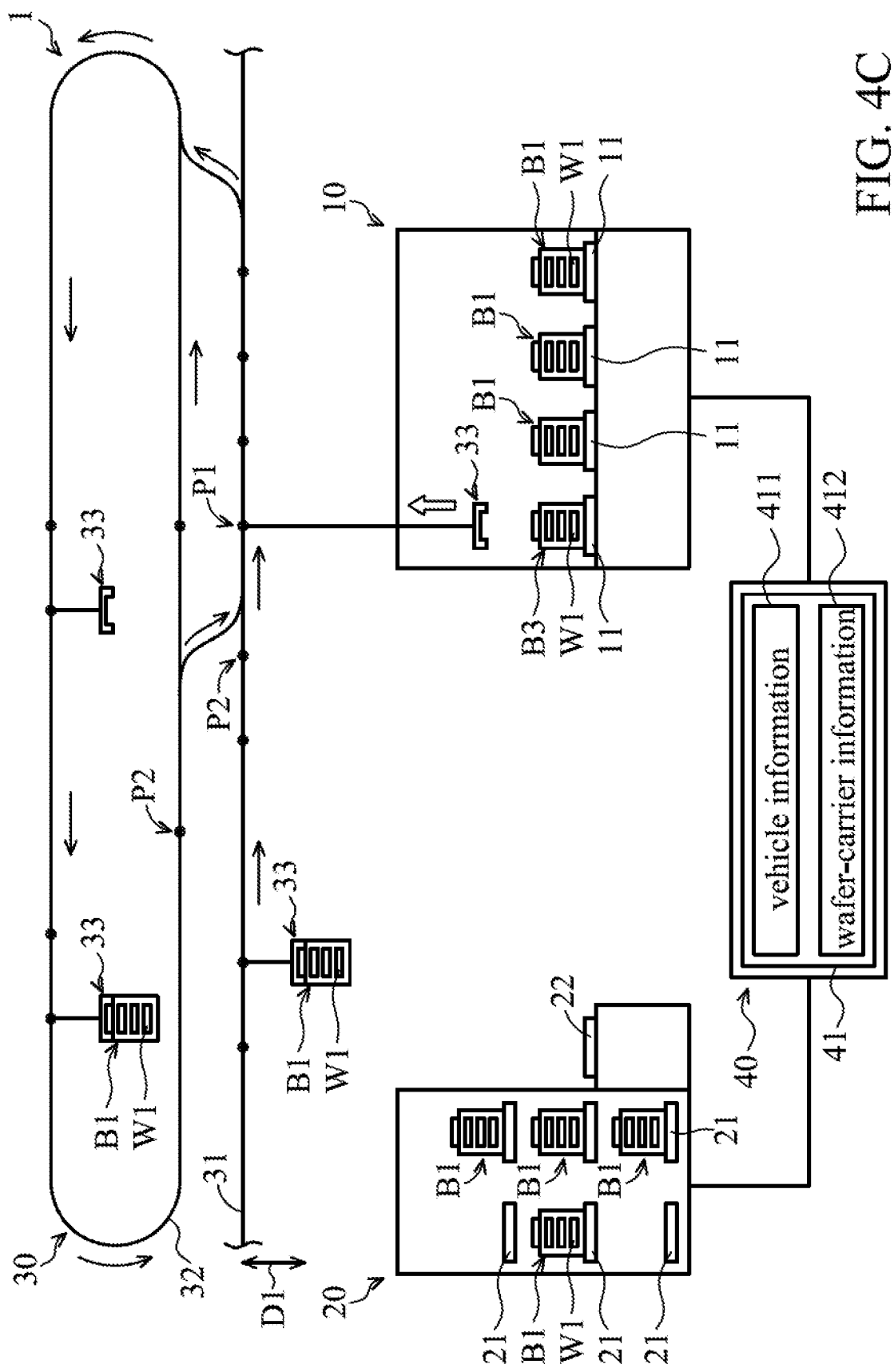

FIGS. 4A to 4C are schematic views of the transport system 1 during intermediate stages of the transport method. In step S111, the assigned wafer carrier B3 is transported toward an elevation position P1 of the main track 31.

As shown in FIGS. 1, 3 and 4A, the assigned wafer carrier B3 is transported from the support base 21 inside of the stocker 20 to the gate port 22 of the stocker 20 during the stocker period E4. The assigned wafer carrier B3 is transported from the gate port 22 toward an elevation position P1 of the main track 31 above the load port 11 by the vehicle 33 during the OHT period E5 as shown in FIGS. 3 and 4B.

In some embodiments, as shown in FIG. 4A, the vehicle 33 moves downwardly to attach the assigned wafer carrier B3 at a departing time T3, and the vehicle 33 moves upwardly to the main track 31 with the assigned wafer carrier B3. Afterward, as shown in FIG. 4B, the vehicle 33 moves along the main track 31 with the assigned wafer carrier B3 at a check position P2 and toward the elevation position P1. The check position P2 is prior to and close to the elevation position P1. In some embodiments, the check position P2 is located at the circular track 32.

In some embodiments, when the vehicle 33 with the assigned wafer carrier B3 is located at the check position P2 or the elevation position P1, the control system 40 checks whether the processing wafer carrier B2 is loaded at the load port 11.

In some embodiments, the vehicle 33 with the assigned wafer carrier B3 is located at the check position P2 and the processing wafer carrier B2 is loaded at the load port 11, as shown in FIG. 4B. The assigned wafer carrier B3 is transported from the main track 31 to the circular track 32 when a priority value of the assigned wafer carrier B3 is lower than a priority value of a following wafer carrier B4, as shown in FIG. 4B. Therefore, the following wafer carrier B4 having a higher priority value can be processed early.

In some embodiments, the assigned wafer carrier B3 is transported the assigned wafer carrier B3 to the circular track 32 when the quality time (Q-time) of the assigned wafer carrier B3 is longer than the quality time of a following wafer carrier B4 as shown in FIG. 4B. Therefore, the following wafer carrier B4 having a shorter quality time can be processed in time.

Afterward, the assigned wafer carrier B3 is transported from the circular track 32 to toward the elevation position P1. Therefore, when the assigned wafer carrier B3 is back to the check position P2 or the elevation position P1 again and the processing wafer carrier B2 is still loaded at the load port 11, the control system may control the vehicle 33 with the assigned wafer carrier B3 to move to the circular track 32 again. Alternatively, the control system controls the vehicle 33 to transport the assigned wafer carrier B3 to the stocker 20 or another semiconductor apparatus In some embodiments, the vehicle 33 with the assigned wafer carrier B3 is located at the check position P2, and the processing wafer carrier B2 is loaded at the load port 11. The assigned wafer carrier B3 is stopped at the check position P2 to wait for the processing wafer carrier B2 to be transported away from the semiconductor apparatus 10 when the quality time of the assigned wafer carrier B3 is less than a predetermined value. The predetermined value may be a value of a period during which the assigned wafer carrier B3 is transported from the check position P2 to the load port 11 via the circular track 32. Therefore, the assigned wafer carrier B3 having a short quality time can be processed in time.

In some embodiments, the assigned wafer carrier B3 is stopped at the check position P2 to wait for the processing wafer carrier B2 to be transported away from the semiconductor apparatus 10 when the quality time of the assigned wafer carrier B3 is shorter than the quality time of a following wafer carrier B4. Therefore, the assigned wafer carrier B3 having a shorter quality time can be processed in time.

In some embodiments, the assigned wafer carrier B3 is stopped at the check position P2 to wait for the processing wafer carrier B2 to be transported away from the semiconductor apparatus 10 when the priority value of the assigned wafer carrier B3 is greater than the priority value of the following wafer carrier B4. Therefore, the assigned wafer carrier B3 having a higher priority value can be processed early.

In some embodiments, the vehicle 33 with the assigned wafer carrier B3 is located at the elevation position P1, and the processing wafer carrier B2 is loaded at the load port 11 of the semiconductor apparatus 10. The assigned wafer carrier B3 is transported to the circular track 32 by the vehicle 33. Afterward, the assigned wafer carrier B3 is transported from the circular track 32 to back to the elevation position P1.

In some embodiments, the semiconductor apparatus 10 may be shut down during the transportation of the assigned wafer carrier B3. In this situation, the control system 40 may control the vehicle 33 to transport the assigned wafer carrier B3 to the stocker 20 or another semiconductor apparatus.

In step S113, the processing wafer carrier B2 is detached from the load port 11 by the vehicle 33 at the process time. The processing wafer carrier B2 is transported away from the semiconductor apparatus 10 by the vehicle 33 during the detaching period E2.

In step S115, the vehicle 33 moves downwardly to put the assigned wafer carrier B3 at the load port 11. Afterward, the assigned wafer carrier B3 is loaded at the load port 11 at about the delivery time T5, as shown in FIG. 4C. Since the assigned wafer carrier B3 is transported at about the delivery time T5, a waiting period between the processed time T4 and the delivery time T5 is shortened. Therefore, the production rate of the semiconductor apparatus 10 is increased.

Figure 5:
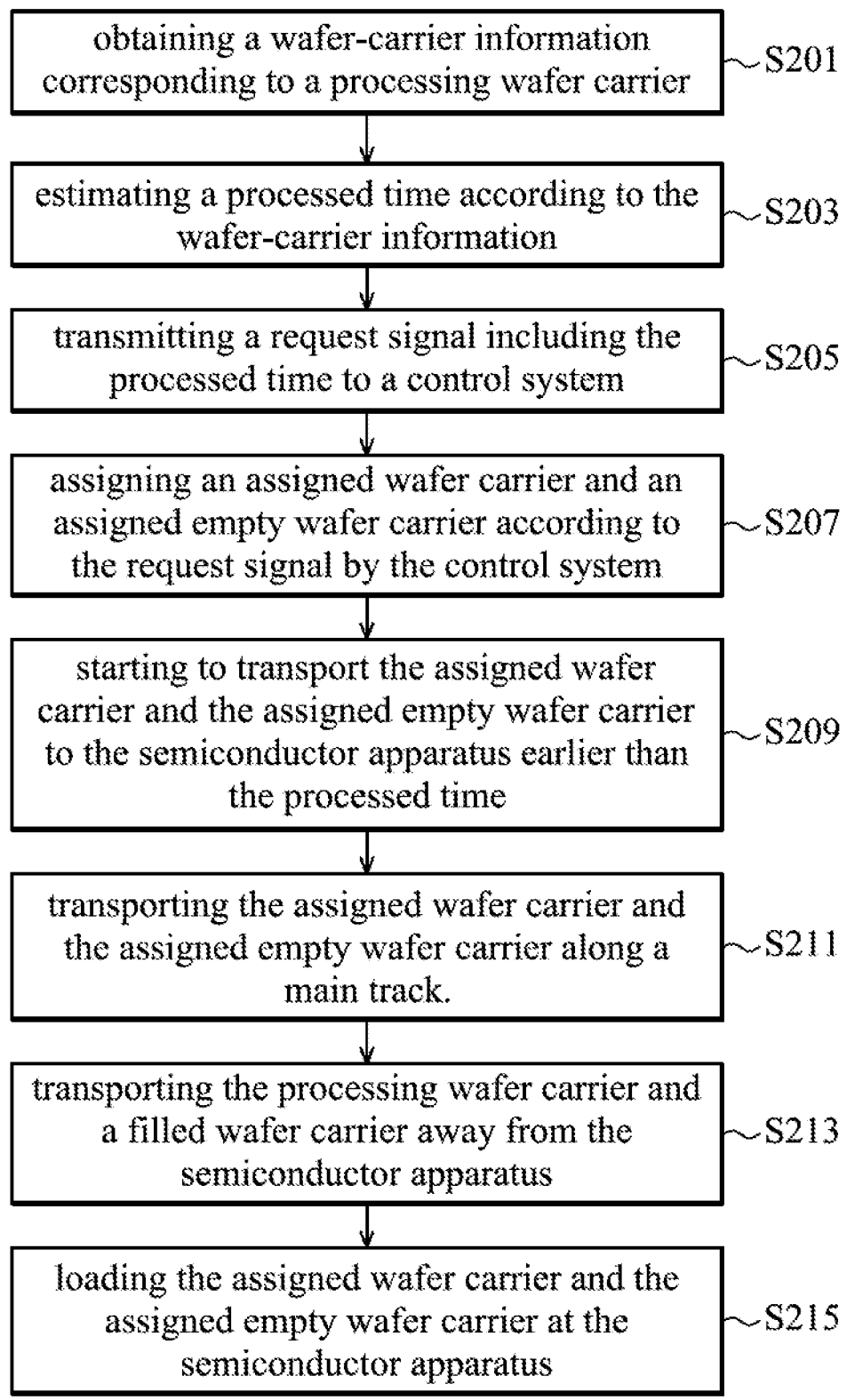
FIG. 5 is a flow chart of a transport method in accordance with some embodiments of the disclosure.
Figure 6A:
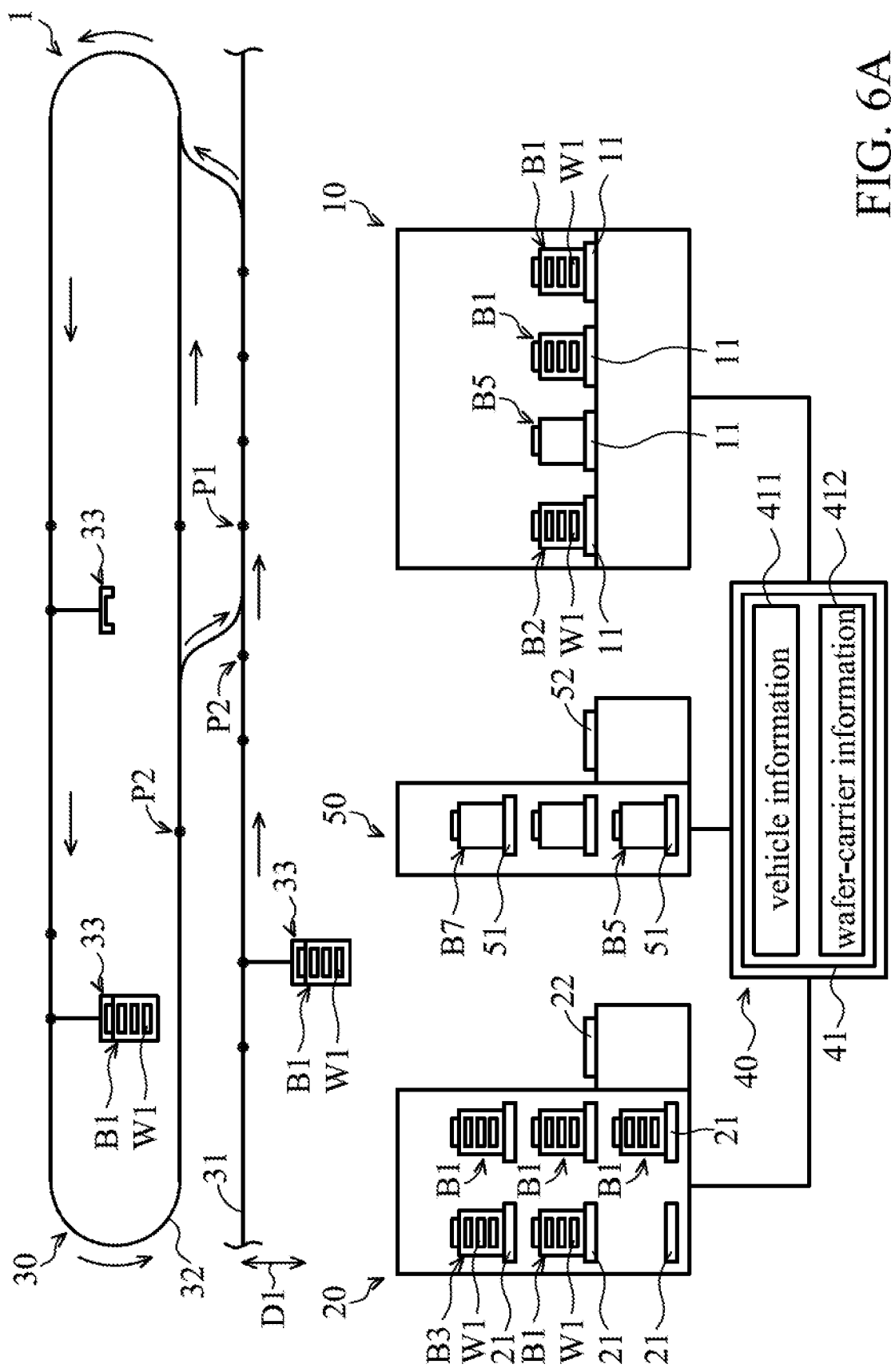
FIGS. 6A to 6C are schematic views of a transport system during intermediate stages of the transport method.
Figure 6B:
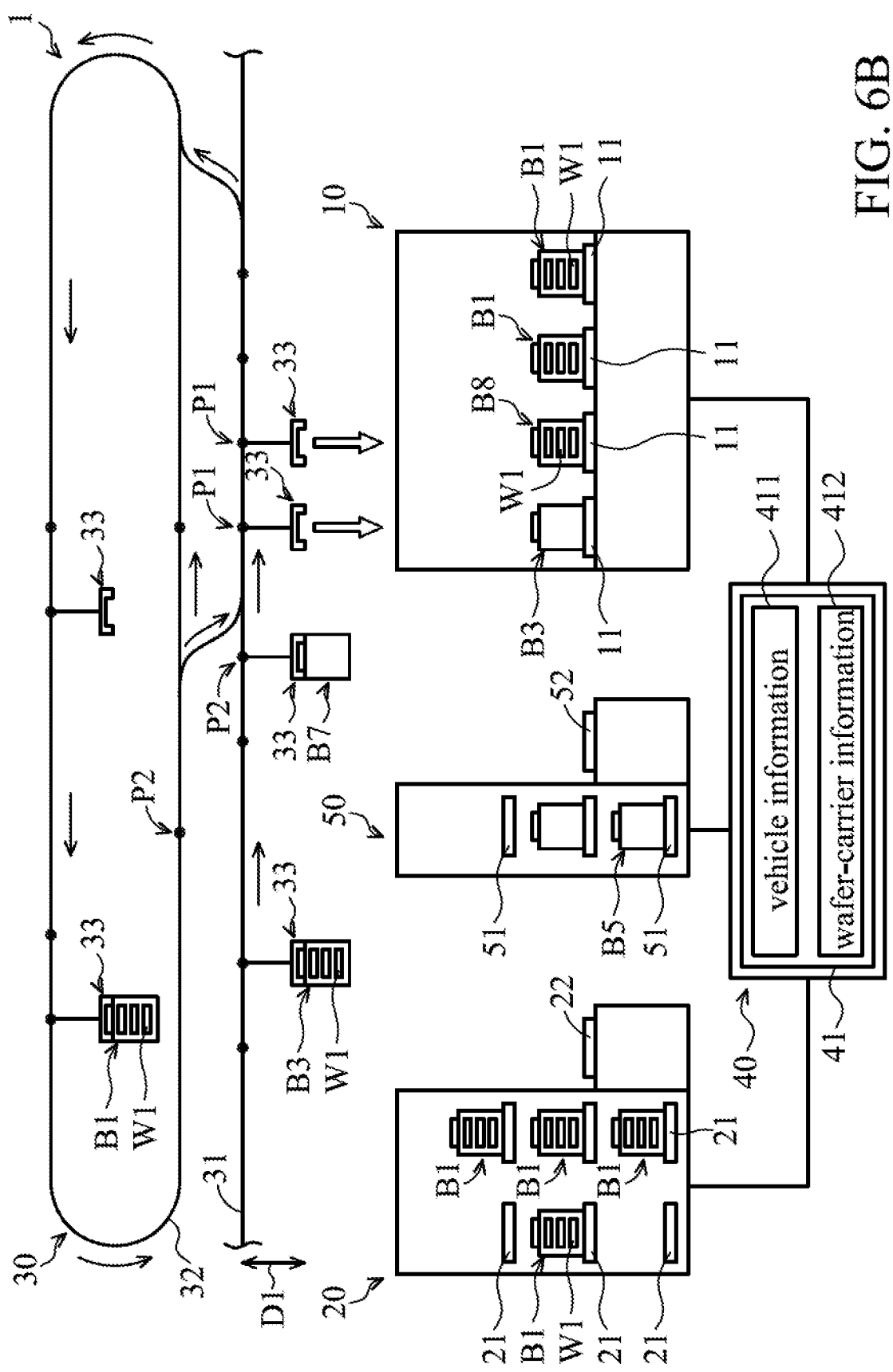
Figure 6C:
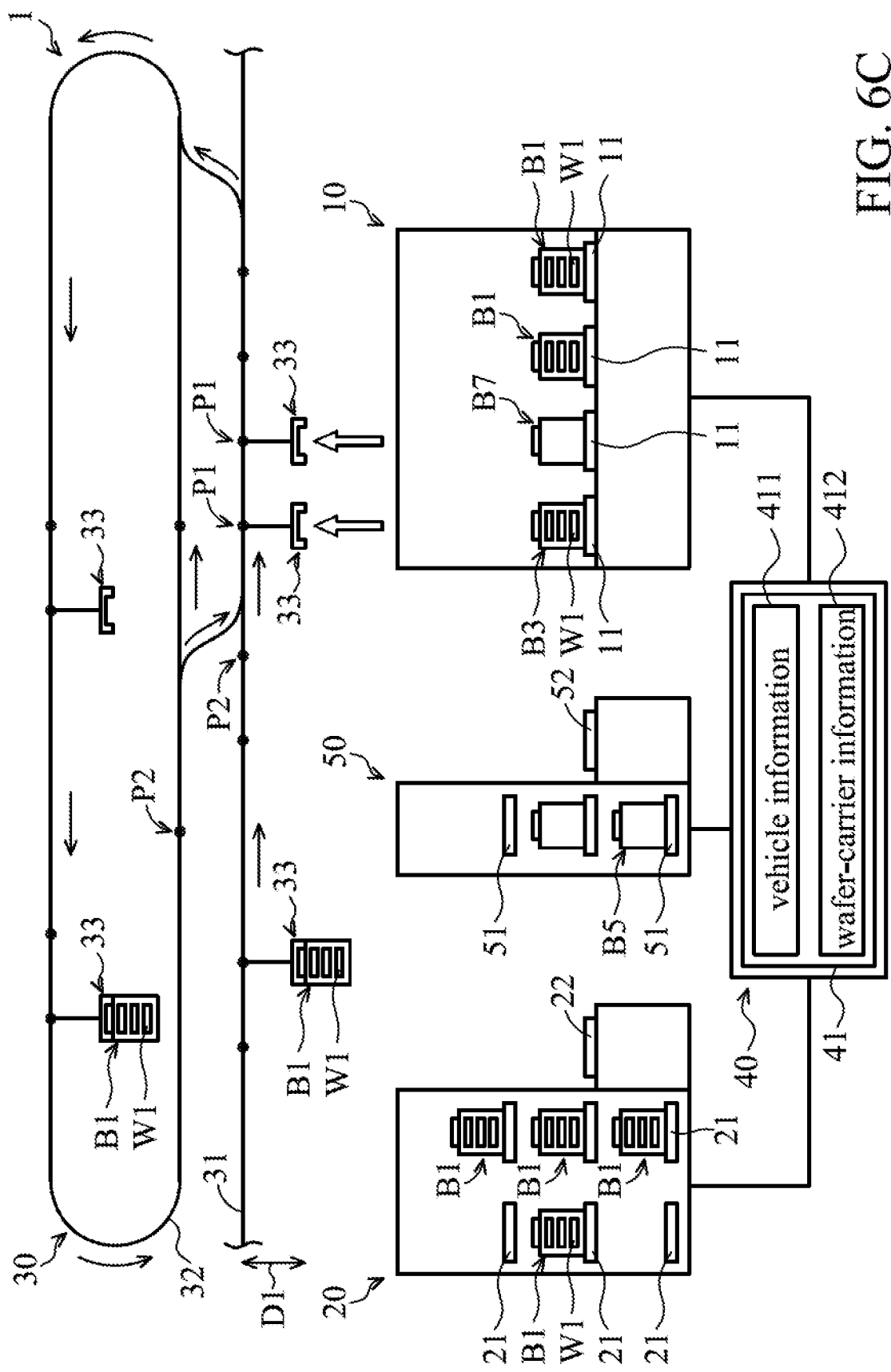

FIG. 5 is a flow chart of a transport method in accordance with some embodiments of the disclosure. FIGS. 6A to 6C are schematic views of the transport system 1 during intermediate stages of the transport method.

As shown in FIG. 6A, the transport system 1 further includes a stocker 50. The stocker 50 is configured to store wafer carriers, especially empty wafer carriers B5. The stocker 50 includes a number of support bases 51 inside the stocker 50 and gate ports 52.

As shown in FIG. 6A, the processing wafer carrier B2 is loaded on the load port 11, and an emptied processing wafer carrier B6 is loaded on the load port 11. The processing wafer carrier B2 includes a number of wafers W1. In this case, when the wafer W1 is processed by the semiconductor apparatus 10, the processed wafer W1 is put into the processing emptied processing wafer carrier B6, rather than the processing wafer carrier B2.

In step S201, the wafer-carrier information 412 corresponding to the processing wafer carrier B2 loaded at the load port 11 is obtained by the semiconductor apparatus 10. In step S203, a processed time is estimated according to the wafer-carrier information 412 by the semiconductor apparatus 10. In step S205, the semiconductor apparatus 10 transmits a request signal that includes the processed time to the control system 40.

In step S207, the control system 40 assigns one of the wafer carriers B1 as an assigned wafer carrier B3 and assigns one of the empty wafer carriers B5 as an assigned empty wafer carrier B7 according to the request signal. In some embodiments, the assigned wafer carrier B3 is stored in the stocker 20, and the assigned empty wafer carrier B7 is stored in the stocker 50. In some embodiments, the assigned wafer carrier B3 and the assigned empty wafer carrier B7 are stored in the same stocker 20 or 50.

In step S209, the control system 40 starts to control the stocker 20 and one of the vehicles 33 to transport the assigned wafer carrier B3 to the semiconductor apparatus 10 at a first start time, which is earlier than the processed time. The control system 40 also starts to control the stocker 50 and one of the vehicles 33 to transport the assigned empty wafer carrier B7 to the semiconductor apparatus 10 at a second start time, which is earlier than the processed time.

In step S211, the assigned wafer carrier B3 is transported toward the elevation position P1 of the main track 31 above the load port 11 by the vehicle 33. The assigned empty wafer carrier B7 is transported toward another elevation position P1 of the main track 31 above another load port 11 by the vehicle 33.

In step S213, the wafers W1 in the processing wafer carrier B2 are processed by the semiconductor apparatus 10, and the processed wafers W1 is put into the empty wafer carrier B5 at the processed time. Therefore, the empty wafer carrier B5 becomes a filled wafer carrier B8 (as shown in FIG. 6B). When the wafers W1 are processed, the control system 40 controls two vehicles 33 to transport the processing wafer carrier B2 and the filled wafer carrier B8 away from the semiconductor apparatus 10 during a detaching time as shown in FIG. 6B.

In step S215, as shown in FIG. 6C, the control controls two vehicles 33 to load the assigned wafer carrier B3 and the assigned empty wafer carrier B7 at different load ports 11 of the semiconductor apparatus 10.

Embodiments of transport systems and transport methods are provided. Since an assigned wafer carrier is transported before the wafers of a processing wafer carrier loaded at a semiconductor apparatus are processed, the waiting period between the time at which the wafers of the processing wafer carrier are processed and the time at which the assigned wafer carrier is delivered to the semiconductor apparatus is shortened. Therefore, the production rate of the semiconductor apparatus is increased. Moreover, since the assigned wafer carrier is delivered to the semiconductor apparatus earlier, the assigned wafer carrier can be processed by the semiconductor apparatus at the Q-time. Therefore, the yield of the wafers W1 of the assigned wafer carrier B3 is improved.

In some embodiments, a transport system is provided. The transport system includes a semiconductor apparatus configured to process a wafer and transmit a request signal at a request time. The request signal includes a processed time according to a processing wafer carrier loaded on a load port thereof. The processed time is defined as an estimated point of time according to the request time plus a process period, which is defined as an estimated period during which a plurality of wafers of the processing wafer carrier are processed by the semiconductor apparatus. The transport system also includes a vehicle configured to transport an assigned wafer carrier to the semiconductor apparatus along a transport path. The transport system further includes a control system configured to control the vehicle. When the control system receives the request signal, the control system estimates a delivery time according to the processed time plus a detaching period, estimates a transport period during which the assigned wafer carrier is transported along the transport path to the load port, and estimates a start time according to the delivery time minus the transport period. The delivery time is an estimated time when the assigned wafer carrier is loaded at the load port at a time later than the processed time and when the processing wafer carrier has been detached from the load port during the detaching period. The control system controls the vehicle to start transporting the assigned wafer carrier at the start time, which is earlier than the processed time.

In some embodiments, a transport method is provided. The transport method includes loading a processing wafer carrier at a load port of a semiconductor apparatus at a request time, wherein the processing wafer carrier contains a plurality of wafers. The transport method also includes estimating a processed time according to the processing wafer carrier by the semiconductor apparatus, wherein the processed time is defined as an estimated point of time according to the request time plus a process period, which is defined as an estimated period during which the plurality of wafers of the processing wafer carrier are processed by the semiconductor apparatus. The transport method also includes transmitting a request signal comprising the processed time to a control system by the semiconductor apparatus at the request time. The transport method further includes assigning an assigned wafer carrier according to the request signal, and estimating a delivery time according to the processed time plus a detaching period by the control system. The delivery time is an estimated time when the assigned wafer carrier is loaded at the load port at a time later than the processed time and when the processing wafer carrier has been detached from the load port during the detaching period. The transport method further includes estimating a transport period during which the assigned wafer carrier is transported along a transport path to the load port, and estimating a start time according to the delivery time minus the transport period by the control system. In addition, the transport method includes starting to transport the assigned wafer carrier to the semiconductor apparatus at the start time, which is earlier than the processed time.

In some embodiments, a transport method is provided. The transport method includes loading a processing wafer carrier at a load port of a semiconductor apparatus, wherein the processing wafer carrier contains a plurality of wafers. The transport method also includes estimating a processed time according to the processing wafer carrier by the semiconductor apparatus, wherein the processed time is defined as an estimated point of time that the plurality of wafers of the processing wafer carrier will be processed by the semiconductor apparatus. The transport method also includes transmitting a request signal comprising the processed time to a control system by the semiconductor apparatus at a request time. The transport method further includes assigning an assigned wafer carrier according to the request signal, and estimating a delivery time according to the processed time plus a detaching period by the control system. The delivery time is an estimated time when the assigned wafer carrier is loaded at the load port at a time later than the processed time and when the processing wafer carrier has been detached from the load port during the detaching period. The transport method further includes estimating a transport period during which the assigned wafer carrier is transported along a transport path to the load port, and estimating a start time according to the delivery time minus the transport period by the control system. In addition, the transport method includes starting to transport the assigned wafer carrier to the load port of the semiconductor apparatus at the start time, which is earlier than the processed time and later than the request time.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A transport system, comprising:
  a semiconductor apparatus, configured to process a wafer and transmit a request signal with a request time to a control system, wherein the request signal comprises a processed time of a processing wafer carrier being loaded on a load port of the semiconductor apparatus at the request time, wherein the processed time is defined as an estimated point of time of the request time plus a process period, wherein the processed period is defined as an estimated period during which a plurality of wafers of the processing wafer carrier are processed by the semiconductor apparatus;
  a vehicle configured to transport an assigned wafer carrier to the semiconductor apparatus along a transport path; and
  the control system is configured to control the vehicle;
  wherein at a time of receiving the request signal by the control system, the control system estimates a delivery time according to the processed time plus a detaching period of the processing wafer carrier being detached from the load port, estimates a transport period during which the assigned wafer carrier is transported along the transport path to the load port, and estimates a start time for transporting the assigned wafer carrier to the load port according to the delivery time minus the transport period;
  wherein the delivery time is an estimated time when the assigned wafer carrier is loaded at the load port at a time later than the processed time and when the processing wafer carrier has been detached from the load port during the detaching period;
  wherein the control system controls the vehicle to start the transporting of the assigned wafer carrier to the load port at the start time, which is earlier than the processed time.

2. The transport system as claimed in claim 1, wherein the control system is further configured to stop the vehicle with the assigned wafer carrier at a check position of the transport path to wait for the processing wafer carrier to be transported away from the semiconductor apparatus when the semiconductor apparatus is occupied with the processing wafer carrier.

3. The transport system as claimed in claim 2, wherein the transport path further has a first elevation position above the semiconductor apparatus, and the check position is located farther away from the semiconductor apparatus than the first elevation position.

4. The transport system as claimed in claim 1, wherein the vehicle is part of an Over Hoist Transport (OHT) system, and wherein the transport system further comprises a stocker configured to store the assigned wafer carrier.

5. The transport system as claimed in claim 1, wherein the start time is between the request time and the processed time.

6. A transport method, comprising:
   loading a processing wafer carrier at a load port of a semiconductor apparatus at a request time, wherein the processing wafer carrier contains a plurality of wafers;
   estimating a processed time according to the processing wafer carrier by the semiconductor apparatus, wherein the processed time is an estimated point of time of the request time plus a process period, wherein the processed period is defined as an estimated period during which the plurality of wafers of the processing wafer carrier are processed by the semiconductor apparatus;
   transmitting a request signal comprising the processed time to a control system by the semiconductor apparatus at the request time;
   assigning an assigned wafer carrier according to the request signal, and estimating a delivery time according to the processed time plus a detaching period of the processing wafer carrier being detached from the load port by the control system, wherein the delivery time is an estimated time when the assigned wafer carrier is loaded at the load port at a time later than the processed time and when the processing wafer carrier has been detached from the load port during the detaching period;
   estimating a transport period during which the assigned wafer carrier is transported along a transport path to the load port, and estimating a start time for transporting the assigned wafer carrier to the load port according to the delivery time minus the transport period by the control system; and
   starting to transport the assigned wafer carrier to the semiconductor apparatus at the start time, which is earlier than the processed time.

7. The transport method as claimed in claim 6, wherein transporting the assigned wafer carrier comprises:
   moving a vehicle with the assigned wafer carrier to a check position of the transport path; and
   moving the vehicle with the assigned wafer carrier to a first elevation position of the transport path above the load port and loading the assigned wafer carrier into the semiconductor apparatus after the processing wafer carrier is detached from the load port of the semiconductor apparatus, wherein the check position is farther away from the semiconductor apparatus than the first elevation position.

8. The transport method as claimed in claim 7, wherein the vehicle with the assigned wafer carrier is stopped at the check position to wait for the processing wafer carrier to be transported away from the semiconductor apparatus when the semiconductor apparatus is occupied with the processing wafer carrier and a quality time of the assigned wafer carrier is less than a predetermined value.

9. The transport method as claimed in claim 7, wherein the vehicle with the assigned wafer carrier is stopped at the check position to wait for the processing wafer carrier to be transported away from the semiconductor apparatus when the semiconductor apparatus is occupied with the processing wafer carrier and a priority value of the assigned wafer carrier is greater than a priority value of a following wafer carrier.

10. The transport method as claimed in claim 7, wherein the vehicle with the assigned wafer carrier is moved from the check position to a circular track when the semiconductor apparatus is occupied with the processing wafer carrier and a priority value of the assigned wafer carrier is lower than a priority value of a following wafer carrier.

11. The transport method as claimed in claim 7, wherein the vehicle with the assigned wafer carrier is moved from the check position to a circular track when the semiconductor apparatus is occupied with the processing wafer carrier and a quality time of the assigned wafer carrier is longer than a quality time of a following wafer carrier.

12. The transport method as claimed in claim 7, wherein the vehicle is part of an Over Hoist Transport (OHT) system.

13. The transport method as claimed in claim 6, wherein the start time is between the request time and the processed time.

14. The transport method as claimed in claim 12, wherein the vehicle with the assigned wafer carrier is moved from a second elevation position above a gate port of a stocker to the check position of the transport path, wherein a distance between the check position and the first elevation position is shorter than a distance between the check position and the second elevation position.

15. The transport method as claimed in claim 14, further comprising:
   estimating a stocker period according to a time period of the assigned wafer carrier transported from inside of the stocker to a gate port by the control system, wherein the start time is earlier than the processed time by the stocker period.

16. The transport method as claimed in claim 14, further comprising:
   estimating an Over Hoist Transport (OHT) period according to a time period of the assigned wafer carrier transported from a gate port of the stocker to the load port of the semiconductor apparatus.

17. A transport method, comprising:
   loading a processing wafer carrier at a load port of a semiconductor apparatus, wherein the processing wafer carrier contains a plurality of wafers;
   estimating a processed time of the processing wafer carrier by the semiconductor apparatus, wherein the processed time is an estimated point of time that the plurality of wafers of the processing wafer carrier are processed by the semiconductor apparatus;
   transmitting a request signal comprising the processed time to a control system by the semiconductor apparatus at a request time;
   assigning an assigned wafer carrier according to the request signal, and estimating a delivery time according to the processed time plus a detaching period of the processing wafer carrier being detached from the load port by the control system, wherein the delivery time is an estimated time when the assigned wafer carrier is loaded at the load port at a time later than the processed time and when the processing wafer carrier has been detached from the load port during the detaching period;
   estimating a transport period during which the assigned wafer carrier is transported along a transport path to the load port, and estimating a start time for transporting the assigned wafer carrier to the load port according to the delivery time minus the transport period by the control system; and starting to transport the assigned wafer carrier to the load port of the semiconductor apparatus at the start time, which is earlier than the processed time and later than the request time.

18. The transport method as claimed in claim 17, wherein the request time is earlier than the processed time by a process period or less, wherein the process period is defined as a period between a time at which the processing wafer carrier is loaded at the semiconductor apparatus and the processed time.

19. The transport method as claimed in claim 18, wherein the transport period includes a stocker period and an Over Hoist Transport (OHT) period, the stocker period is a time period of the assigned wafer carrier transported from inside of a stocker to a gate port of the stocker, and the OHT period is a time period of the assigned wafer carrier transported from the gate port to the load port of the semiconductor apparatus, and wherein the process period is larger than the transport period.

20. The transport method as claimed in claim 17, wherein transporting the assigned wafer carrier comprises:

moving a vehicle with the assigned wafer carrier to a check position of the transport path; and moving the vehicle with the assigned wafer carrier to a first elevation position of the transport path above the load port and loading the assigned wafer carrier into the semiconductor apparatus after the processing wafer carrier is detached from the load port of the semiconductor apparatus, wherein the check position is farther away from the semiconductor apparatus than the first elevation position.

* * * * *